March 10, 1959 — MAGUR-LAG GABRUSTI — 2,876,545
MORTAR SIGHT
Filed Dec. 19, 1957 — 9 Sheets-Sheet 3
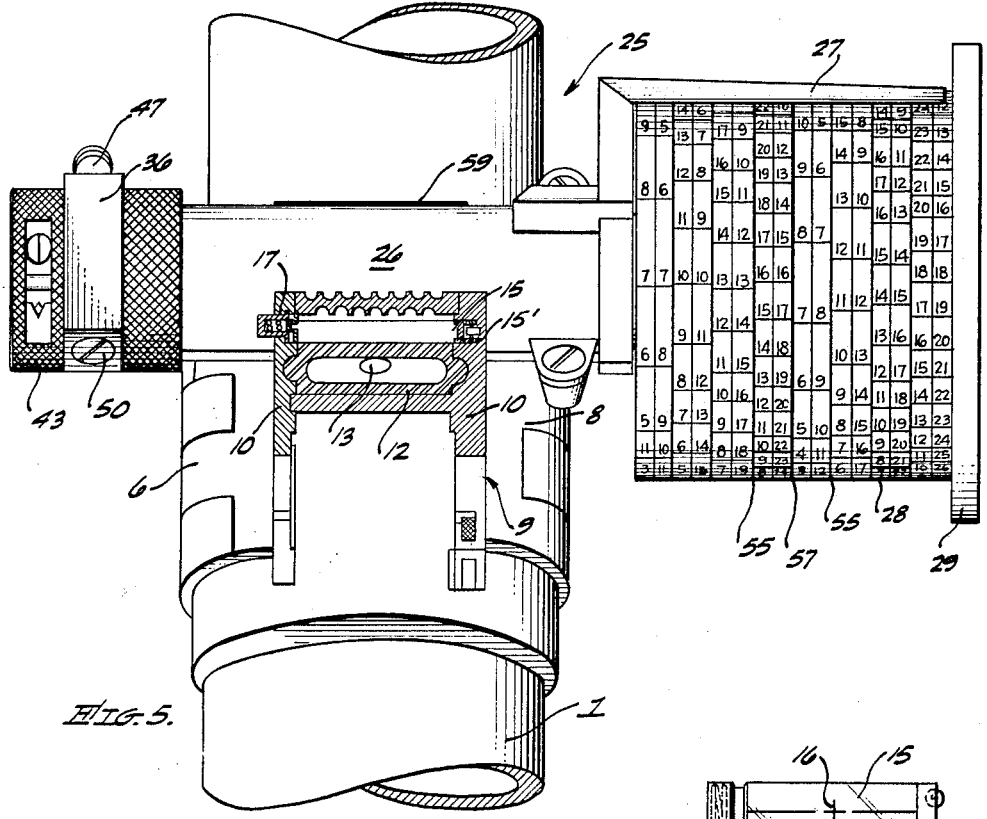
FIG. 5.
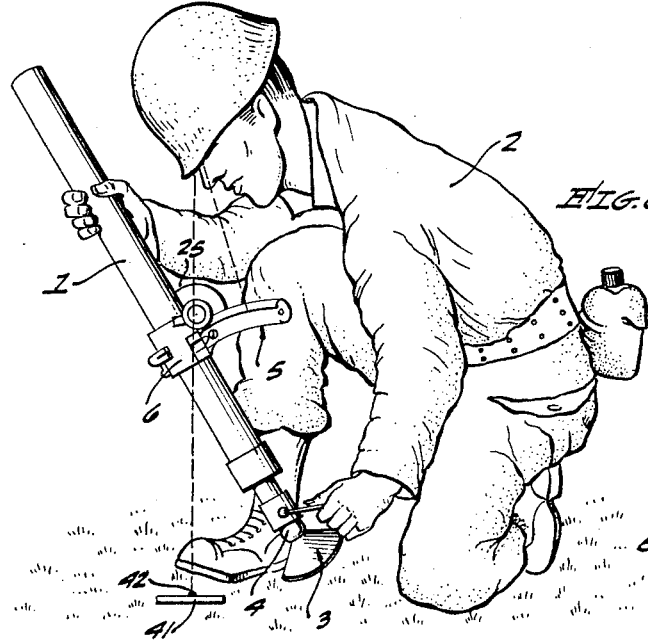
FIG. 8.
FIG. 6.
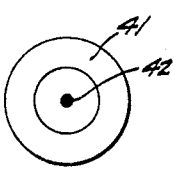
FIG. 7.
INVENTOR.
MAGUR-LAG GABRUSTI,
BY
ATTORNEY.

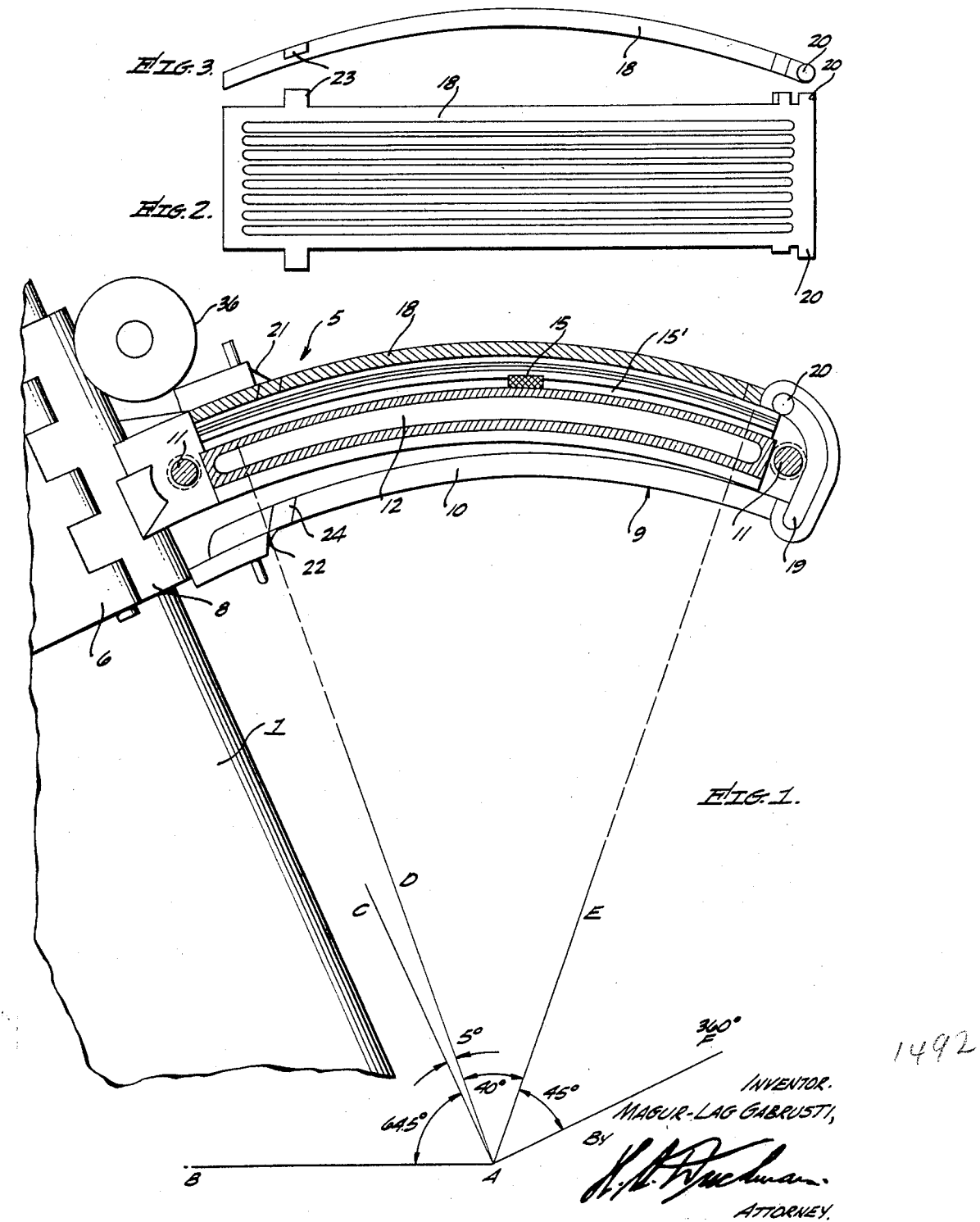

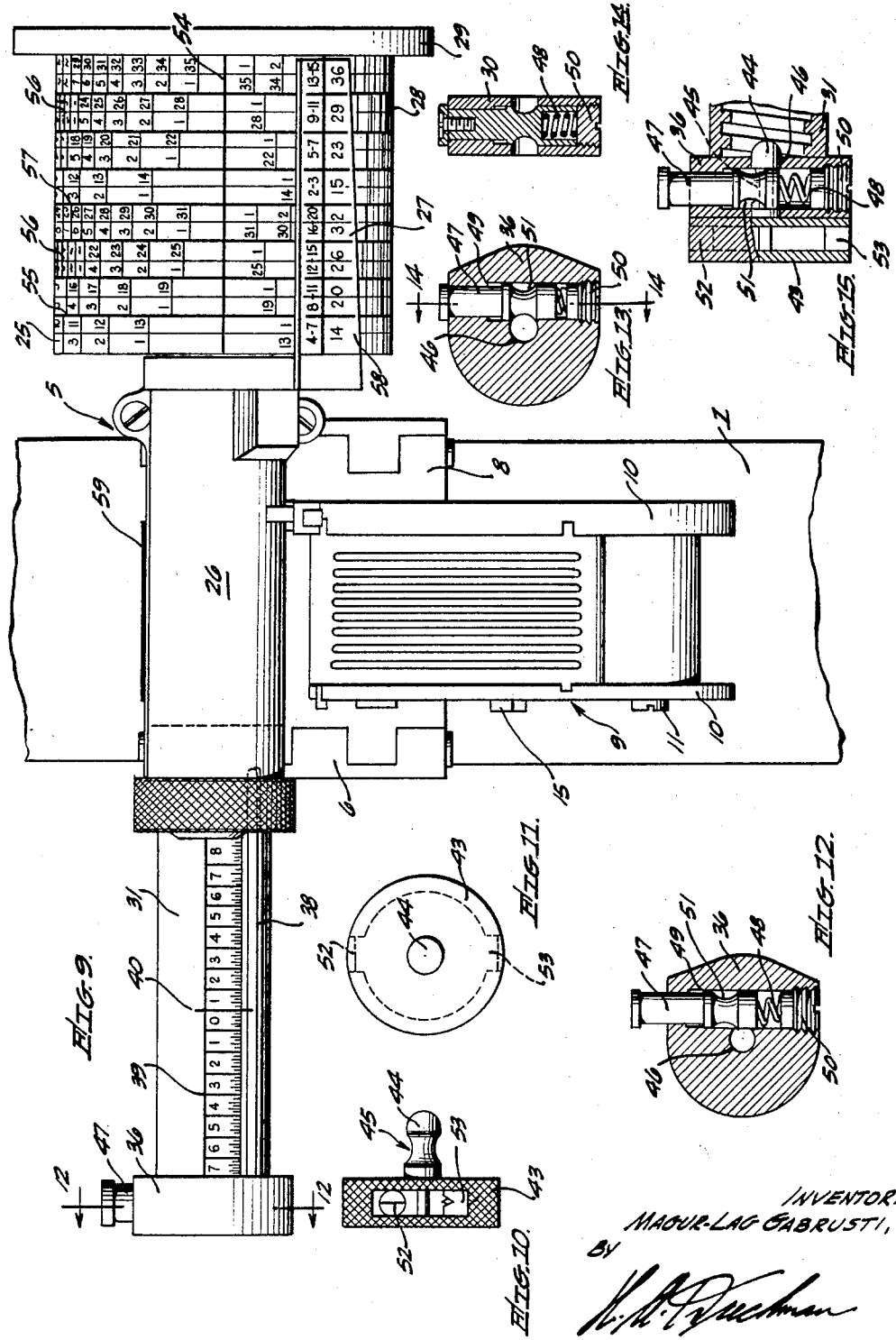

March 10, 1959  MAGUR-LAG GABRUSTI  2,876,545
MORTAR SIGHT
Filed Dec. 19, 1957  9 Sheets-Sheet 5

INVENTOR
MAGUR-LAG GABRUSTI,
BY
ATTORNEY.

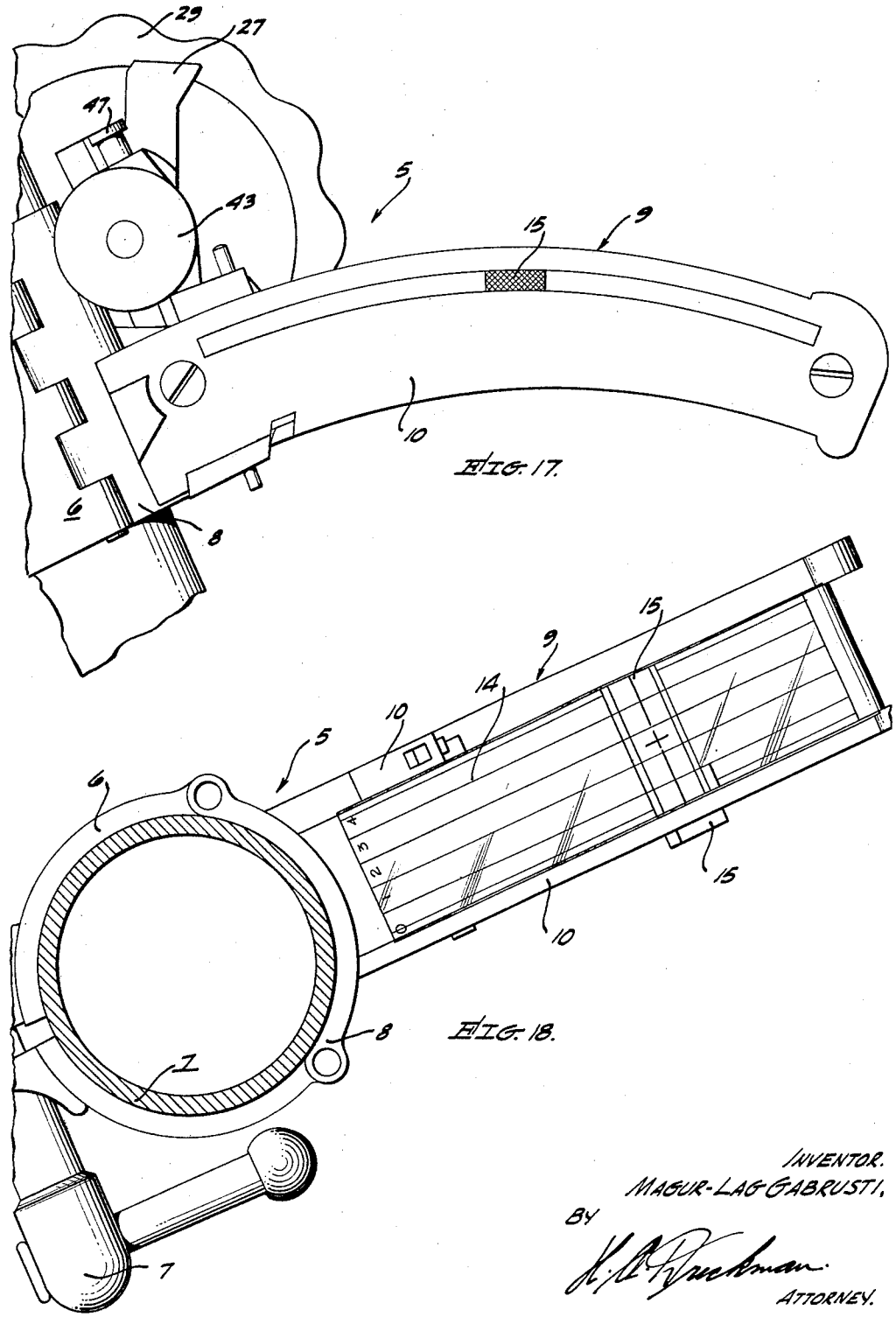

March 10, 1959 — MAGUR-LAG GABRUSTI — 2,876,545
MORTAR SIGHT
Filed Dec. 19, 1957 — 9 Sheets-Sheet 7
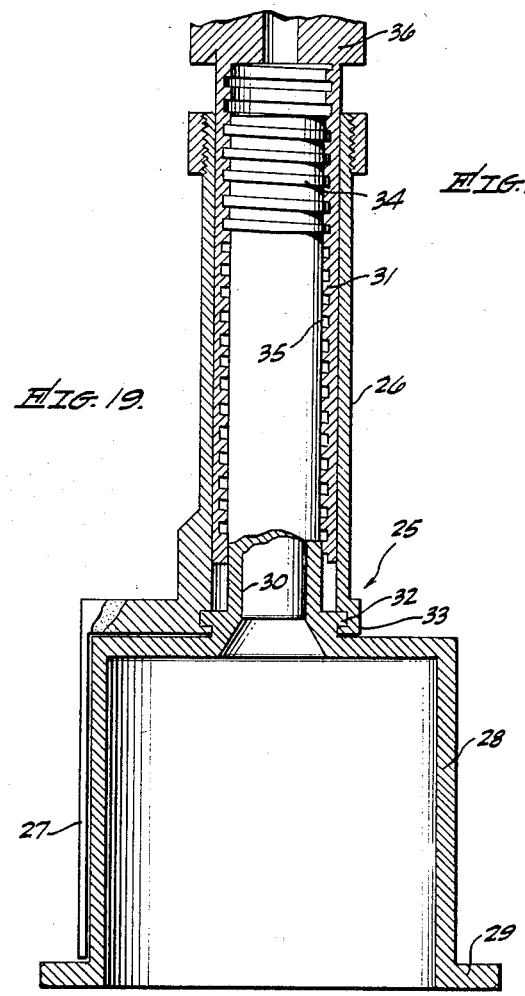
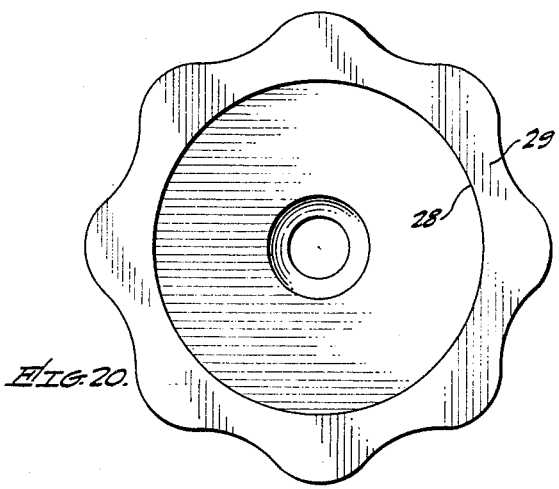
INVENTOR.
MAGUR-LAG GABRUSTI,
BY
ATTORNEY.

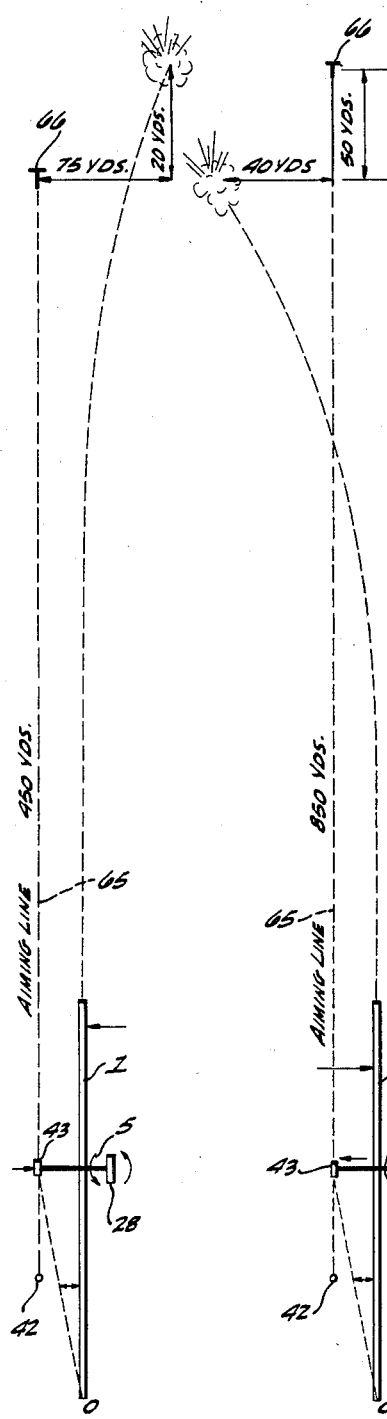
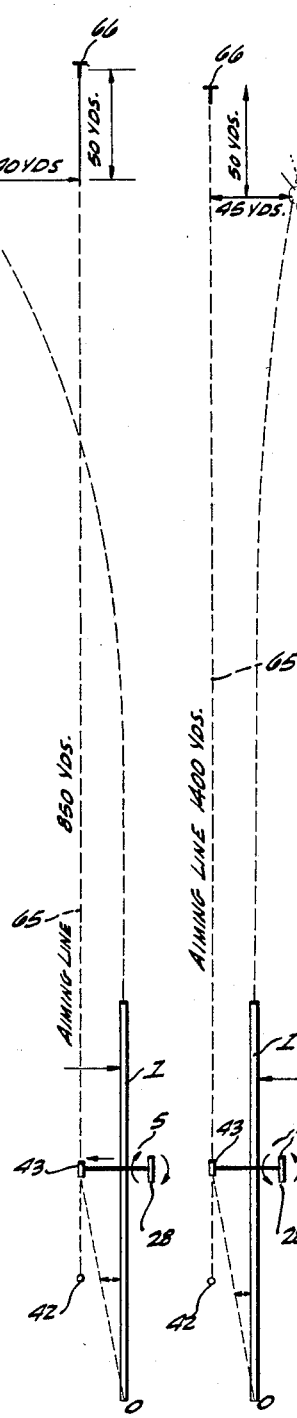
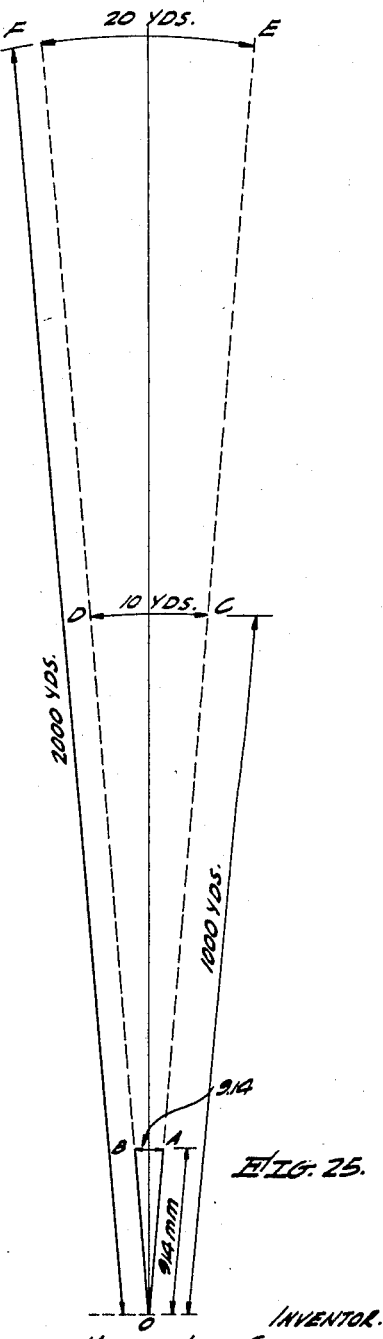
FIG. 22.   FIG. 23.   FIG. 24.   FIG. 25.

March 10, 1959     MAGUR-LAG GABRUSTI     2,876,545
MORTAR SIGHT
Filed Dec. 19, 1957     9 Sheets-Sheet 9
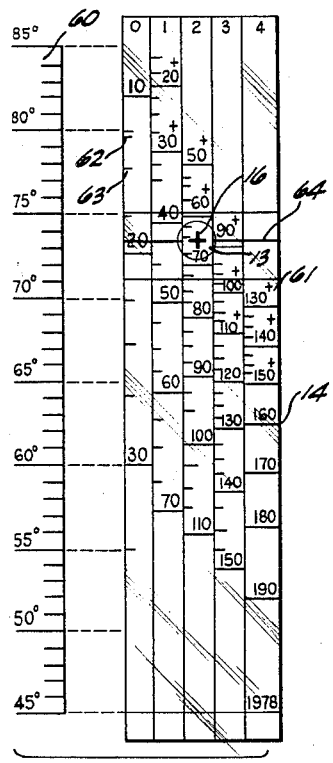
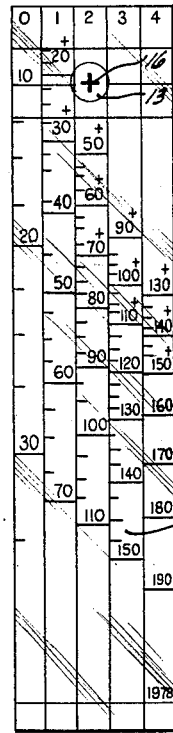
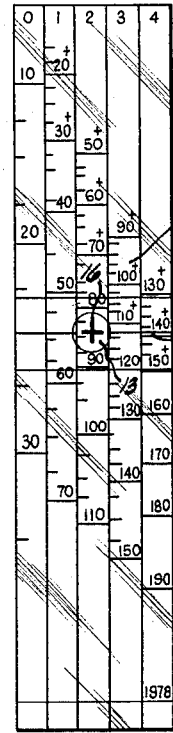
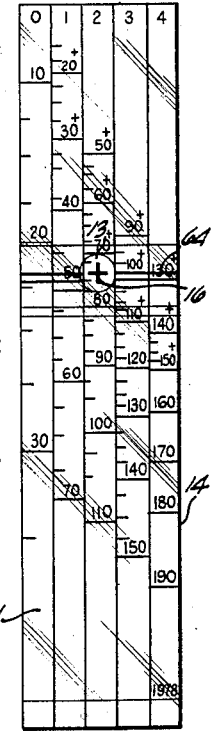
FIG. 26.     FIG. 27.     FIG. 28.     FIG. 29.
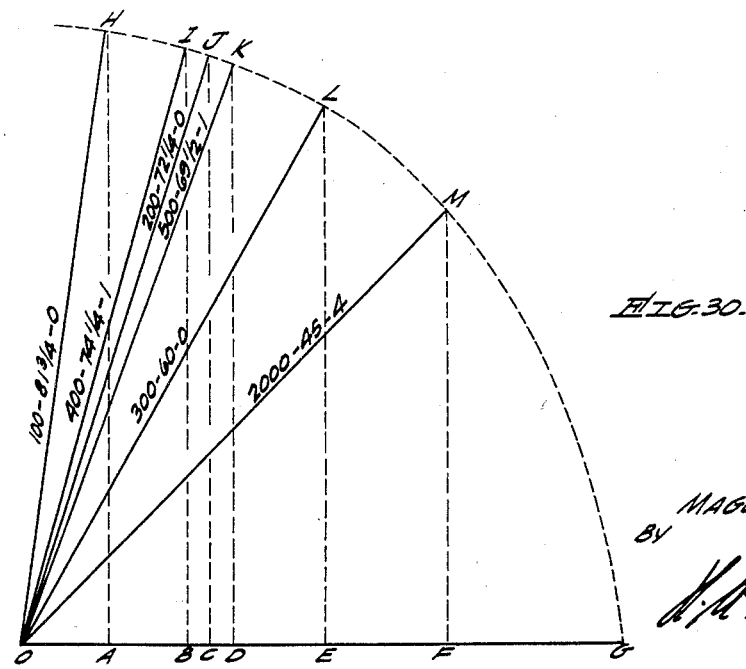
FIG. 30.
INVENTOR:
MAGUR-LAG GABRUSTI,
BY
ATTORNEY.

United States Patent Office 2,876,545
Patented Mar. 10, 1959

2,876,545

MORTAR SIGHT

Magur-Lag Gabrusti, Long Beach, Calif.

Application December 19, 1957, Serial No. 703,785

15 Claims. (Cl. 33—48)

This invention relates to a mortar sight, and particularly a sight which can be attached to the barrel of a portable type of mortar. By portable type is meant the mortar which can be carried by one or more men and which is aimed and fired by one man. There are several sizes of mortars of this type, such as 60 and 81 mm.

An object of my invention is to provide a mortar sight in which the firing table now required is entirely eliminated, and also there is no necessity of reading a firing table with a consequent waste of time. With my sight the range or azimuth angle is obtained manually by moving the barrel of the gun through a vertical angle, and the bearing is obtained by again moving the gun manually through a horizontal angle.

Another object of my invention is to provide a mortar sight in which the gunner is not concerned with the measurement of degrees to obtain the required elevation, since in my sight the range is translated directly into yards on the longitudinal scale of my sight.

A further object is to provide a mortar sight in which the gunner is not required to read mils since mils are not used in my sight. Deflection tables are not required, and also since the mil is a very small unit it is not necessary for the gunner to read small calibrations on the sight.

My sight is also a definite improvement on the M–4 sight and it is possible to read my sight more accurately, and also to obtain corrections for as small a unit as five yards, and especially with a range of more or less than one thousand yards.

Another object of my invention is to provide a mortar sight in which it is possible for the gunner to correct both range and bearing without having to read a firing table or deflection table, or fine graduations such as mil graduations on a scale. In my sight the gunner obtains the necessary corrections by observing a single pointing arm, and also a bubble in the longitudinal scale of the sight. Also in my sight it is unnecessary to use a base stick, and also only one bubble is used instead of two as in sights heretofore in use.

Another feature of my improved mortar sight is that it will give great accuracy up to five yards in range and up to two yards, more or less, in bearing.

Other objects, advantages and features of invention may appear from the accompanying drawings, the subjoined detailed description and the appended claims.

In the drawing:

Figure 1 is a side elevation of my mortar sight as mounted on the barrel of a gun.

Figure 2 is a top plan view of the longitudinal scale cover.

Figure 3 is a side elevation of the cover plate.

Figure 5 is a rear elevation partly in section of my sight.

Figure 6 is a top plan view of the manual slide.

Figure 7 is a top plan view of the base plate with the sighting point thereon.

Figure 8 is a view of a figure using the sight on a mortar.

Figure 9 is a rear elevation of my sight mechanism as mounted on a gun barrel.

Figure 10 is a transverse sectional view of the collimator on the end of the bearing or deflection tube.

Figure 11 is a side view of the same.

Figure 12 is a sectional view taken on line 12—12 of Fig. 9.

Figure 13 is a view similar to Fig. 12 but showing the locking pin in another position.

Figure 14 is a sectional view taken on line 14—14 of Fig. 13.

Figure 15 is a fragmentary vertical sectional view of the outer end of the bearing or deflection tube.

Figure 17 is a side elevation of my gun sight as viewed from the left.

Figure 18 is a top plan view of the azimuth or range sight only and illustrating the barrel clamp.

Figure 19 is a fragmentary longitudinal sectional view of the deflection mechanism.

Figure 20 is an end view of the same and illustrating the handle portion.

Figure 21 is a plan view of the deflection or horizontal scale.

Figure 22 is a schematic view illustrating one firing condition.

Figure 23 is a schematic view showing another firing condition.

Figure 24 is a schematic view showing still another schematic firing condition.

Figure 25 is a schematic view illustrating a bearing or deflection correction.

Figure 26 illustrates one position of the bubble at one range position.

Figure 27 is a view similar to Fig. 26 but showing another range position.

Figure 28 is a view similar to Fig. 26 but showing still another range position.

Figure 29 is a view similar to Fig. 26 and showing still another range position.

Figure 30 is a scale illustrating the deflection or bearing correction of my gun sight.

Figure 4:
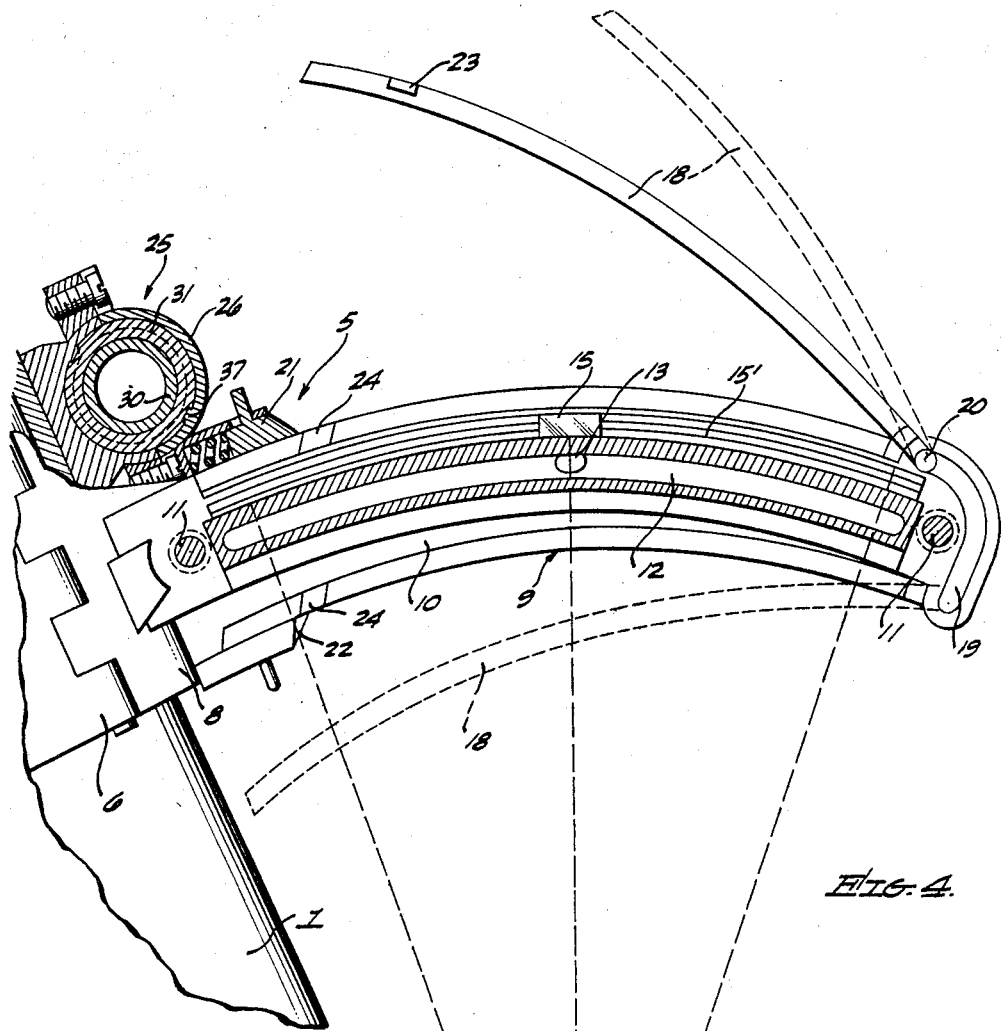
Figure 4 is a vertical sectional view of the sight in which the side plate has been cut away to disclose the bubble tube mounting.

Referring more particularly to the drawings, the numeral 1 indicates the barrel of a mortar. The barrel 1 is held at an angle to the horizontal as shown by the operator 2 in Figure 8. The gun barrel 1 is adjusted through an appropriate vertical and a horizontal angle to hit the target. This is usual and well known with portable mortars. A base plate 3, preferably circular in shape, is mounted on the lower end of the barrel 1 and the barrel can be moved to various angular positions relative to the base 3 since an appropriate universal joint 4 connects the base plate and the barrel. My gun sight 5 is clamped onto the barrel 1 by means of a multisectioned circular clamp 6 as best shown in Fig. 18. The clamp 6 includes a threaded handle 7 whereby the clamp 6 is tightly secured to the barrel 1. The arcuate plate 8 of the clamp is an integral part of the sighting mechanism, as will be subsequently described.

The range or azimuth mechanism 9 of my gun sight 5 consists of a pair of side plates 10—10 which are arranged parallel to each other and are integrally formed at one end with the clamp plate 8. The side plates 10—10 are held in proper spaced relation by the transverse bolts 11—11 which extend therethrough. The side plates 10—10 hold a bubble tube 12 therebetween, and this bubble tube is preferably formed of glass or transparent plastic, and is also formed in a regular curve from front to rear thereof. The bubble tube 12 contains a bubble 13 and the purpose of this bubble will be subsequently described. A longitudinal scale 14, which is best shown in Figs. 26, 27, 28 and 29, is etched, cut, printed, or otherwise formed on the upper surface of the bubble tube 12. It will be noted particularly from Fig. 5 that the bubble tube 12 has a flat or elongated transverse shape so that a flat upper surface is thus provided upon which the scale 14 can be scribed or otherwise positioned. It will be evident also that as the gun barrel 1 is raised or lowered to vary the vertical angle that the bubble 13 will move lengthwise of the bubble tube 12. Also the bubble will move under the scale 14. A range finder 15 is slidably mounted above the bubble tube 12 and can be moved from one end of the bubble tube to the other. The range finder 15 consists of an essentially flat plate formed with a cross-mark 16 on its bottom surface. The range finder 15 is also formed of a transparent material, such as plastic or the like, so that it is possible to look through the range finder and onto the bubble tube 12.

The range finder 15 fits into a groove 15' in one of the end walls 10 and the other end projects through a slot 17 in the other end wall, so that the range finder can be manually adjusted from one end of the bubble tube 12 to the other end thereof, and will be consistently held and guided between the side walls 10—10 of the gun sight.

To protect the bubble tube 12, as well as the range finder slide 15 when the sight is not in use, I provide a cover plate 18. This cover plate is arcuately shaped similar to the side walls 10—10 and it is hingedly and pivotally mounted between the side plates 10—10 as follows: The plates 10—10 are each provided with an arcuate groove 19 formed at the outer ends thereof, and the cover plate 18 is formed with outwardly projecting lugs 20—20 at one end thereof which fit into the grooves 19. Thus it will be evident that the cover plate can be swung upwardly and also rotated within the grooves 19 in a manner best shown in Fig. 4. The cover plate 18 is held in its top position to cover the tube 12 by means of a spring loaded latch 21 on the clamp end of the side walls 10—10. A similar latch 22 at the bottom of the side walls 10 and also at the clamp end thereof will hold the cover plate 18 against the bottom of the arcuate bubble tube 12 when the gun sight is in actual use. In this position the bubble tube 12 is exposed and can be observed by the gunner. To properly align the cover plate 18 in both of its positions, outwardly projecting lugs 23 are provided adjacent the end opposite the pivotal mounting 20, and the purpose of these lugs is to serve as a latch keeper when in the grooves 24 in the side walls, and also to act as a handle, thus properly holding the cover plate in both of its upper and lower positions.

Before describing the operation of the range or azimuth mechanism previously described, the bearing or horizontal angle mechanism will be described in detail. This bearing angle is also termed the deflection mechanism. The purpose of this mechanism is to adjust for a bearing correction and for this purpose the gun is moved through a horizontal angle, either to the left or the right, as might be necessary to correct the trajectory of the shell. The bearing or deflection mechanism is indicated generally at 25 and includes a tubular base 26 which is an integral part, or is fixedly attached to the clamp plate 8. The tube 26 is positioned just above the arcuate longitudinal sighting mechanism 9 and includes a pointing arm 27 fixedly mounted on one end thereof or integrally formed, if desired, and this arm extends longitudinally of an enlarged shell 28. A circular handle or grip 29 is formed on the outer end of the shell 28 so that this shell may be rotated as required by the gunner. The shell 28 is rotatably mounted in the tube 26 in the following manner: A trunnion or shaft 30 extends from one end of the shell 28 and is journaled within the sleeve 31, which sleeve is journaled in the tube 26. A collar 32 on the shell 28 engages a ring seat 33 at the end of the tube 26 so that the shell is prevented from moving endwise relative to the tube. The trunnion 30 has threads 34 formed at the inner end thereof and these threads mesh with internal threads 35 in the sleeve 31. Thus as the shell 28 might be rotated the sleeve 31 will be moved longitudinally within the tube 26 to adjust said sleeve relative to the end of the tube 26 opposite the shell 28. A stop ring 36 is formed on the outer end of the sleeve 31 for the purpose of limiting the inward movement of the sleeve and acts as a stop by engaging the outer end of the tube 26. The sleeve 31 can move longitudinally within the tube 26 but is prevented from rotating within the tube by the inwardly projecting ribs 37, which ribs fit into appropriate external grooves 38 in the sleeve 31. Thus the sleeve 31 can move in and out of the tube 26 but cannot rotate within the tube because of the interengaging ribs 37 and grooves 38. The sleeve 31 is provided with a scale 39 running lengthwise thereof and this scale extends from the zero mark 40, which zero mark is approximately in the center of the sleeve. The scale progresses upwardly from the zero mark 40 and the purpose and operation of this scale will be subsequently described.

To provide for a base point or marker I provide a disc 41 formed of a suitable plastic or rubber and which has variously colored discs on both surfaces thereof, and with a central dot or marker 42 in the center thereof which serves as the base or locating point. This is shown in Figs. 7 and 8. The method of using the base plate or marker will be subsequently described. For use with the base plate or point I provide a collimator or open sight 43, shown in Figs. 5, 10, 11 and 15, and this collimator consists of a hollow disc which is mounted on the outer end of the sleeve 31, and particularly on the outer flat face of the stop ring 36. The means to detachably mount the collimator on the outer face of the stop ring 36 is as follows: A pin 44 projects from the rear face of the disc 43 and this pin is provided with an annular neck 45 which serves as the locking means for the disc 43, as will be subsequently described. The stop ring 36 is formed with a bore 46 to receive the pin 44. A latch bolt 47 extends radially into the stop ring 36 and intersects the bore 46. A spring 48 bears against the bottom of the latch bolt 47 and presses the latch bolt upwardly against the stop shoulder 49. The spring 48 is held in position by means of the threaded plug 50. The latch bolt 47 is formed with an annular neck or depression 51 which aligns with the bore 46 when the latch bolt is depressed. In this depressed position the pin 44 can be pushed into the stop ring 36 until the neck portion 45 thereof aligns with the latch bolt 47. When the latch bolt is released and is pushed upwardly by the spring bolt 48 the full diameter portion of the latch bolt then enters the neck portion 45 of the pin 44 (as shown in Fig. 15) to lock the pin and the collimator housing 43 in position. The collimator housing 43 thus is securely held on the outer end of the sleeve 31 but can be rotated around the pin 44 as might be necessary. A pair of diametrically arranged openings 52—53 are provided in the hollow disc 43 of the collimator housing. These openings are for the purpose of aligning the collimator or open sight with the base point 42.

The cylindrical shell 28 is calibrated as follows: A heavy horizontal line 54 is the zero mark for the shell calibrations. The calibrations consist of a plurality of peripherally arranged spaces separated by heavy lines 55. These heavy lines divide the surface of the cylinder into annular spaces in which two columns of figures are arranged, these columns being separated by a light line 56. Another heavy line 57 divides the calibrations generally into a left-hand group and a right-hand group. The pointing arm 27 is also provided with spaced numbers 58 thereon, which numbers are aligned with the various circular columns between the heavy lines 55. As the cylindrical shell 28 is rotated it will move the sleeve 31 inwardly or outwardly a distance corresponding to the spaces in the scale 39 for each complete revolution of the cylindrical shell 28. When the gun is originally positioned and set ready for the first shot, the sleeve 31 is retracted until the zero mark 40 thereon is aligned with the edge of the base 26.

The principles upon which the longitudinal and deflection scales are made and the operation of the mortar sight is as follows: The sight is first clamped to the barrel 1 of the gun and is so positioned that the upper edge of the base 26 is exactly aligned with a scribed or cut mark 59 on the gun barrel. This properly positions the sight with respect to the length of the barrel. The longitudinal or range mechanism 9 of the gun sight is, of course, positioned on top of the gun barrel with respect to the gunner so that it can be observed as required. In Fig. 1 of the drawing the line AC is parallel with the barrel 1 of the gun. The line AF is perpendicular to AC. The transparent bubble tube 12 is so constructed and positioned that the inner end thereof adjacent the gun barrel starts approximately where the line AC intersects the side plates 10. Assume a continuation of the bubble tube 12 until it intersects the line AF and the bubble tube marked at that point as 0°. Also assume that the bubble tube 12 is then divided into 90° descending from the inner to the outer end thereof. If the barrel 1 is now placed parallel to the ground, that is, on the line AB, the bubble would occupy a position exactly below the 0° line, or AF. As the muzzle of the gun is now raised above the ground the bubble would gradually move over the 90° calibrations, that is, the bubble would show exactly the position of the tube in degrees from the 0° mark and thence through an arc of 90°. The scale on the bubble tube 12 is indicated at 60 in Fig. 26. The upper surface of the bubble tube 12 has five longitudinal scales thereon arranged in parallel columns as shown at 61 in Figs. 16, 26, 27, 28 and 29. The bubble 13 in the tube 12 can only move from the 45° point to the 85° point, since this is the only practical range of positions for the barrel of a mortar. Since the bubble tube 12 has considerable width the bubble 13, therefore, has considerable length and can be used for cross leveling purposes. The columns 61 are numbered 0, 1, 2, 3 and 4 as shown, and the zero scale is used only for zero charge firings. The scale in the number 1 column is used for charge 1 firings, 2 for charge 2, etc. The manner in which the various columns 0 to 4, inclusive, are calibrated is as follows: A 100 yard range requires an elevation of 81¾°; therefore, opposite 81¾ the numeral 10 is placed. For 125 yard range an elevation of 79½° is required and at this point a small mark 62 is scribed on the scale. For 150 yards an elevation of 77½° is required and again a small mark 63 is scribed at this point and so on until the entire column 0 has been calibrated to the mark opposite the 45° elevation on the scale 60. In column 1 again a series of spaced calibrations are arranged commencing with 20 and increasing to 70. Similarly, the columns 2, 3 and 4 are calibrated for the various charges of the gun. Assuming now that a round is to be fired at the 100 yard range; the gunner simply places movable rider 15 so that its cross hair 64 is in line with the mark under the numeral 10 on the zero scale. The gunner then raises the muzzle of the gun until the bubble 13 is exactly under the cross hair 64. He then sights through the collimator at the aiming point 42 as shown in Fig. 8, and then cross levels the barrel of the gun by placing the bubble 13 exactly under the intersection of the cross hair 64, the line under the numeral 10 as shown in Figs. 26 to 29, inclusive.

Considering another example of a round to be fired at a 425 yard range. The cross hair 64 of the rider 15 is positioned on the line under the numeral 40 in column 1, interpolating the distance below the numeral 40 to indicate the 425 yard position. The gun is again cross leveled, as stated above, and the bubble again is positioned as described, at which time the gun is fired. In the columns the numeral 10 indicates 100 yards, 20 indicates 200 yards, 40 indicates 400 yards, etc. Also small markings between the numbers indicate 25 yard distances. The third example shown in Fig. 28 is for a 490 yard range, and the fourth example as shown in Fig. 29 utilizes column 2 and a 1400 yard range. Thus the gunner neglects all other scales except the one he is using for a given range.

Considering now the use of the bearing or deflection mechanism 25. I have found that the aligning mark 59 on the barrel 1 should be 450 mm. above the base plate 3 of the gun. The threads 35 are so cut that the complete turn of the shell 28 will move the sleeve 31 a distance of 4.5 mm. Assuming that the barrel of the gun equals one yard, this is 914 mm. This distance equals the line OB Fig. 25. If the muzzle of the gun is now moved 9.14 mm. to the right of the OB position to the position OA, and if the lines OB and OA are extended for 100 yards then the distance between these lines is 100 times the 9.14 distance, or one yard. At 1000 yards the deflection from D to C Fig. 25 would be 10 yards. At 2000 yards the distance FE equals 20 yards. The bearing or deflection mechanism 25 is positioned 450 mm. from the base of the gun and, therefore, a deflection of 4.5 mm. at the 450 mm. point would actually give the same result as 9.14 mm. at the 914 mm. point as diagrammatically shown in Fig. 25.

A mortar is usually fired at a high angle, that is, a rather large verticle angle as is usual and well known. Considering now Fig. 30, and assume that the line OG in that figure is 450 mm. long and G is the point on the barrel 1 where the deflection mechanism is placed, that is, the mark 59. The curve HG, therefore, is the curve which is traversed by the mark 59 on the barrel of the gun as the gun barrel is raised from a horizontal to a vertical position. For a 100 yard range the muzzle of the gun is raised 81¾° using zero charge. The deflection mechanism would then be at the point H in Fig. 30. If a perpendicular line is now drawn from H to the line OG it would terminate at A. OA is then the distance which should be considered in order to find out how much the gun barrel must be moved to one side for a one yard deflection at the 100 yard range. The actual distance from O to A is about 67 mm. Using the following formula to determine the setting of the gun we have $$450 \text{ mm.}:4.5 \text{ mm.} = 67 \text{ mm.}:X \text{ mm.}$$

$$X \text{ mm.} = \frac{4.5 \text{ mm.} \times 67 \text{ mm.}}{450 \text{ mm.}} = .67 \text{ mm.}$$

Therefore, .67 mm. deflection at point H using a zero charge with the barrel at an 81¾° angle would provide a one yard deflection at 100 yard range. To determine the amount of deflection for one complete turn of the shell assembly 28 which is 4.5 mm., and assuming the same range (100 yards) and the same zero charge using the same formula we have $$.67 \text{ mm.}:1 \text{ yd.} = 4.5 \text{ mm.}:X \text{ yd.}$$

$$X \text{ yds.} = \frac{1 \text{ yd.} \times 4.5 \text{ mm.}}{.67 \text{ mm.}} = \text{about } 6.7 \text{ yds.}$$

As a third example let us assume a 200 yard range. The mark 59 on the pump barrel is now at the point J in Fig. 30. OJ, therefore, is the position of the barrel for a 200 yard range, also with a zero charge. The distance OC is now the one to calculate. In other words, to determine how much the gun barrel should be moved horizontally at the point C in order to have a two yard deflection at 200 yards and with a zero charge. The following is a formula:

$$450 \text{ mm.}: 4.5 \text{ mm.} = 138 \text{ mm.}: X \text{ mm.}$$

$$X \text{ mm.} = \frac{4.5 \text{ mm.} \times 138 \text{ mm.}}{450 \text{ mm.}} = 1.38 \text{ mm.}$$

The various required deflections at different ranges can similarly be calculated as they might be required.

The following table gives the deflection for different ranges and different charges:

| | | | |
|---|---|---|---|
| 100—6.7 yds | } Average 6 yards. | 200*—15.5 yds | } Average 15 yds. |
| 200—6.5 yds | | 300*—15. yds | |
| 300—6. yds | | | |
| 400—15. yds | | | |
| 500—14.4 yds | } Average 14 yards. | 500*—23.2 yds | } Average 23 yds. |
| 600—13.7 yds | | 600*—23. yds | |
| 700—12.7 yds | | 700*—22.5 yds | |
| 800—22.2 yds | | | |
| 900—21. yds | } Average 20 yards. | 900*—29.5 yds | } Average 29 yds. |
| 1,000—20.6 yds | | 1,000*—28.8 yds | |
| 1,100—19.5 yds | | 1,100*—28.6 yds | |
| 1,200—28.2 yds | | | |
| 1,300—27.6 yds | } Average 26 yards. | 1,300*—36.4 yds | } Average 35 yds. |
| 1,400—26.6 yds | | 1,400*—35.2 yds | |
| 1,500—25.1 yds | | 1,500*—34.6 yds | |
| 1,600—34. yds | | | |
| 1,700—33.3 yds | | | |
| 1,800—32.1 yds | } Average 32 yards. | | |
| 1,900—30.5 yds | | | |
| 2,000—28.2 yds | | | |

The above asterisks indicate ranges with different charges than the ranges indicated in the left-hand column.

It will be noticed that some different ranges with the same charge have almost the same deflection caused by one complete turn of the shell 28. Therefore, it is preferable to combine or average the deflections for different ranges, for example, for 100, 200, 300 yard ranges an average deflection of six yards. For 400, 500, 600 and 700 yard ranges fired with charge one an average deflection of 14 yards is used for one turn of the shell 28. For 1200, 1300, 1400 and 1500 yard ranges the deflection is 26 yards, etc., as set forth in the chart above.

Figure 16:
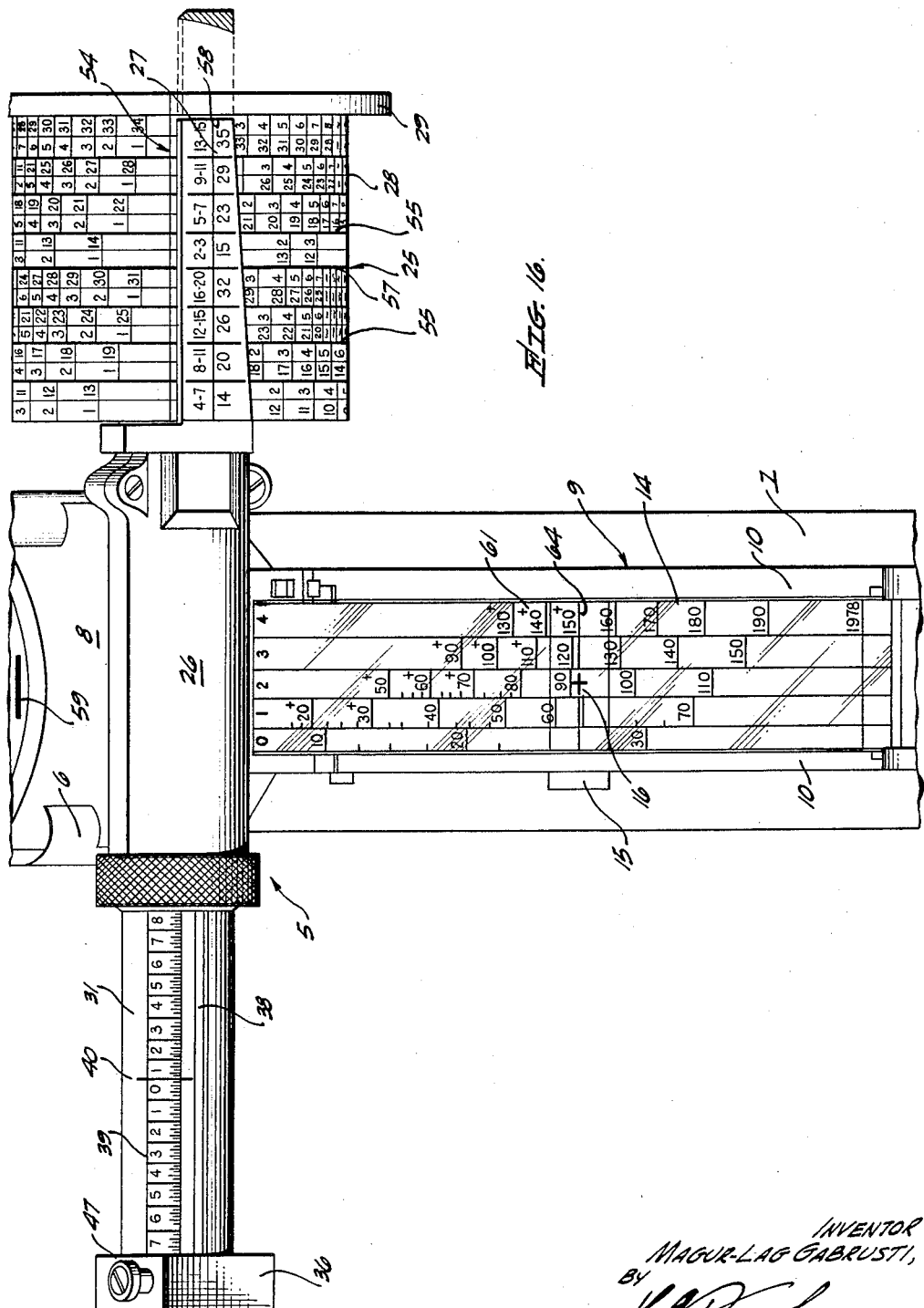
Figure 16 is a rear elevation of my mortar sight in operative position.

The sleeve 31 is divided into exact halves by the heavy line 40 (Fig. 16). This vertical line is called the zero line of the deflection sleeve 31. From this zero line the entire length of the sleeve is divided into 4.5 mm. units and they are numbered progressively outwardly from the zero mark 40. In starting to fire the mortar it is necessary to retract the sleeve 31 until the mark 40 or the zero mark is in line with the outer surface of the tube 26. This is the position assumed when the first round is fired. The correction for range is made on the scale 61 as previously described, and also the deflection to right or left is accomplished by rotating the shell 28 and to move the sleeve 31 outwardly or inwardly relative to the tube 26 as required and as detailed above. In order to calibrate the scale 14 on the surface of the shell 28 the following procedure may be employed: A developed plan view of the shell 28 to show the scale 14 as shown in Fig. 21. Starting from the zero line 54 on the surface of the shell the first column on the left is divided into fourteen equal parts and numbered from 1 to 13, the numbers running counter to each other on each side of the light line 56. On the pointing arm 27 directly above this left-hand column the numbers 4–7 are placed and below them the numeral 14. This indicates to the gunner that 4–7 means that the scale on the shell 28 is for the ranges from 400 to 700 yards. The number below the numeral 14 on the arm 27 means that the deflection for these ranges in yards is as read on the scale in the first left-hand column and is corrected by one complete turn of the shell 28. The remaining numerals on the arm 27 are, of course, similarly arranged. The four scales to the right of the heavy line 57 are for those ranges that have to be fired at a higher angle and with additional charges.

The aiming procedure and the corrections are as follows: The gunner takes up a sitting or kneeling position as in Fig. 8. After the base plate 3 is set firmly on the ground and the deflection sleeve 31 is set on the starting position, that is, with the zero mark 40 positioned as described previously, the gun is now pointed at the target. The horizontal zero mark 54 on the shell 28 will be positioned directly below the straight pointing edge of the arm 27. The gunner now places the disc 41 with its aiming point 42 directly under the collimator 43 by sighting vertically downward through the collimator. As an example, if a round is to be fired at a 450 yard range, as shown in Fig. 22, the gunner places the aiming line 16 on the rider 15 on the second small mark below the numeral 40 on the charge 1 scale. See Figs. 26, 27, 28 and 29. If the first round went over the target by 20 yards and is off to the right by 15 yards, then to correct this condition the gunner brings the aiming line 16 of the rider 15 back to the 425 yard mark, and then interpolates to about ⅕ of the next 25 yards. Now the gunner turns the deflection shell 28 counter clockwise looking at the scale directly below the numerals 4–7 for one complete turn, which equals 14 yards plus one more yard. The deflection arm will bring the collimator 43 closer to the end of the base tube 26, so that the angle between the collimator and the end of the tube 26 will become smaller. Now the gunner again lines up the open sights in the collimator 43 with the aiming point 42, which will be termed the straight aiming line 65 from the aiming point 42 to the target 66. The gun will now be corrected to the left, as shown in Fig. 23.

Another example might be as follows: If a round is to be fired at a 1400 yard range, as shown in Fig. 24, the gunner places the cross hair 16 of the rider 15 on a complete line below 140 on the charge scale 3. See Figs. 26 to 29, inclusive. The deflection mechanism is at the zero mark 40, as previously described. If the first round misses the target by 45 yards to the right, as shown in Fig. 24, and was also 50 yards short, the gunner moves the cross hairs 16 of the rider 15 for two small marks and observes the scale on the surface of the shell 28 directly below the numerals 13–15 on the pointing arm 27; at the same time turning the shell 28 counter clockwise for one complete turn, which equals 35 yards plus a fraction of a turn to indicate 10 yards. Again by sighting through the collimator 43 onto the base point 42 the gun barrel will be corrected to be directly on target. To correct the deflection the collimator must be moved towards the same side of the target that the round is misplaced. Also the same column of figures must be continuously read on the deflection scale of the shell 28, as shown in Fig. 21. That is, if the round has gone to the left of the target, then to correct this the collimator must also be moved towards the left and the correction on the rotating shell 28 is also on the left side of the fine line 56 which separates the figures in the columns as shown in Fig. 21. If the round is misplaced to the right, then the collimater is also moved to the right and the figures on the right-hand side of the fine lines 56 are observed for the correction.

While I have described my aiming device as being mounted 450 mm. above the base plate, this distance could obviously be changed if desired, in which case the threads 34 and 35 in the sleeve 31 and shaft 30 would be altered accordingly to accomplish the results described above.

Having described my invention, I claim:

1. A mortar sight for a gun including a barrel, said sight comprising a range sighting mechanism and a deflection mechanism, clamp means securing said range sighting and deflection mechanisms to the barrel of the gun, said range sighting mechanism including a bubble tube, a range scale on the upper surface of the bubble tube, a frame including side plates in which the bubble tube is mounted, a rider positioned above the bubble tube and means slidably mounting the rider in the side plates, said rider being movable lengthwise of the bubble tube, said deflection mechanism including a tubular base, a sleeve, means mounting the sleeve in the base for reciprocal movement therein, a collimator on said sleeve, and manually operable means to project and retract said sleeve in the tubular base.

2. A mortar sight for a gun including a barrel, said sight comprising a range sighting mechanism and a deflection mechanism, clamp means securing said range sighting and deflection mechanisms to the barrel of the gun, said range sighting mechanism including a bubble tube formed of a transparent material, a range scale on the upper surface of the bubble tube, a frame including side plates in which the bubble tube is mounted, a rider positioned above the bubble tube, said rider being formed of a transparent material, means slidably mounting the rider in the side plates, said rider being movable longitudinally of the bubble tube, said deflection mechanism including a tubular base, a sleeve, means mounting the sleeve in the base for reciprocal movement therein, a collimator on said sleeve, and manually operable means to project and retract said sleeve in the tubular base.

3. A mortar sight for a gun including a barrel, said sight comprising a range sighting mechanism and a deflection mechanism, clamp means securing said range sighting and deflection mechanisms to the barrel of the gun, said range sighting mechanism including a bubble tube formed of a transparent material, and said bubble tube having a substantial width, a range scale on the upper surface of the bubble tube and extending lengthwise thereof, a frame including side plates in which the bubble tube is fixedly mounted, a rider formed of a transparent material and positioned above the bubble tube, means slidably mounting the rider in the side plates for manual adjustment relative to the bubble tube, said deflection mechanism including a tubular base, a sleeve, means mounting the sleeve in the base for reciprocal movement therein, a collimator on said sleeve, and manually operable means to project and retract said sleeve in the tubular base.

4. A mortar sight for a gun including a barrel, said sight comprising a range sighting mechanism and a deflection mechanism, clamp means securing said range sighting and deflection mechanisms to the barrel of the gun, said range sighting mechanism including a bubble tube, a range scale on the upper surface of the bubble tube, a frame including side plates in which the bubble tube is mounted, a rider positioned above the bubble tube and means slidably mounting the rider in the side plates, said rider being movable lengthwise of the bubble tube, said deflection mechanism including a tubular base, a sleeve slidably mounted in said tubular base, manually operable means engaging said sleeve to retract or project said sleeve in the tubular base, and a collimator mounted on said sleeve.

5. A mortar sight for a gun including a barrel, said sight comprising a range sighting mechanism and a deflection mechanism, clamp means securing said range sighting and deflection mechanisms to the barrel of the gun, said range sighting mechanism including a bubble tube formed of a transparent material, a range scale on the upper surface of the bubble tube, a frame including side plates in which the bubble tube is mounted, a rider positioned above the bubble tube, said rider being formed of a transparent material, means slidably mounting the rider in the side plates, said rider being movable longitudinally of the bubble tube, said deflection mechanism including a tubular base, a sleeve slidably mounted in said tubular base, manually operable means engaging said sleeve to retract or project said sleeve in the tubular base, and a collimator mounted on said sleeve.

6. A mortar sight for a gun including a barrel, said sight comprising a range sighting mechanism and a deflection mechanism, clamp means securing said range sighting and deflection mechanisms to the barrel of the gun, said range sighting mechanism including a bubble tube formed of a transparent material, and said bubble tube having a substantial width, a range scale on the upper surface of the bubble tube and extending lengthwise thereof, a frame including side plates in which the bubble tube is fixedly mounted, a rider formed of a transparent material and positioned above the bubble tube, means slidably mounting the rider in the side plates for manual adjustment relative to the bubble tube, said deflection mechanism including a tubular base, a sleeve slidably mounted in said tubular base, manually operable means engaging said sleeve to retract or project said sleeve in the tubular base, and a collimator mounted on said sleeve.

7. A mortar sight for a gun including a barrel, said sight comprising a range sighting mechanism and a deflection mechanism, clamp means securing said range sighting and deflection mechanisms to the barrel of the gun, said range sighting mechanism including a bubble tube, a range scale on the upper surface of the bubble tube, a frame including side plates in which the bubble tube is mounted, a rider positioned above the bubble tube and means slidably mounting the rider in the side plates, said rider being movable lengthwise of the bubble tube, said deflection mechanism including a tubular base, a sleeve slidably mounted in said tubular base and projectable therefrom, a cylindrical shell rotatably mounted on said tubular base, a shaft projecting from said cylindrical shell and into said sleeve, interengaging threads on the shaft and sleeve whereby rotation of the shell will extend or retract said sleeve in said tube, a deflection scale on the outer surface of said cylindrical shell, a stationary finger projecting over the surface of said shell, a scale on the finger cooperating with the scale on the shell, and a collimator mounted on said sleeve.

8. A mortar sight for a gun including a barrel, said sight comprising a range sighting mechanism and a deflection mechanism, clamp means securing said range sighting and deflection mechanisms to the barrel of the gun, said range sighting mechanism including a bubble tube formed of a transparent material, a range scale on the upper surface of the bubble tube, a frame including side plates in which the bubble tube is mounted, a rider positioned above the bubble tube, said rider being formed of a transparent material, means slidably mounting the rider in the side plates, said rider being movable longitudinally of the bubble tube, said deflection mechanism including a tubular base, a sleeve slidably mounted in said tubular base and projectable therefrom, a cylindrical shell rotatably mounted on said tubular base, a shaft projecting from said cylindrical shell and into said sleeve, interengaging threads on the shaft and sleeve whereby rotation of the shell will extend or retract said sleeve in said tube, a deflection scale on the outer surface of said cylindrical shell, a stationary finger projecting over the surface of said shell, a scale on the finger cooperating with the scale on the shell, and a collimator mounted on said sleeve.

9. A mortar sight for a gun including a barrel, said sight comprising a range sighting mechanism and a deflection mechanism, clamp means securing said range sighting and deflection mechanisms to the barrel of the gun, said range sighting mechanism including a bubble tube formed of a transparent material, and said bubble tube having a substantial width, a range scale on the upper surface of the bubble tube and extending lengthwise thereof, a frame including side plates in which the bubble tube is fixedly mounted, a rider formed of a transparent material and positioned above the bubble tube, means slidably mounting the rider in the side plates for manual adjustment relative to the bubble tube, said deflection mechanism including a tubular base, a sleeve slidably mounted in said tubular base and projectable therefrom, a cylindrical shell rotatably mounted on said tubular base, a shaft projecting from said cylindrical shell and into said sleeve, interengaging threads on the shaft and sleeve whereby rotation of the shell will extend or retract said sleeve in said tube, a deflection scale on the outer surface of said cylindrical shell, a stationary finger projecting over the surface of said shell, a scale on the finger cooperating with the scale on the shell, and a collimator mounted on said sleeve.

10. A mortar sight for a gun including a barrel, said sight comprising a range sighting mechanism and a deflection mechanism, clamp means securing said range sighting and deflection mechanisms to the barrel of the gun, said range sighting mechanism including a bubble tube formed of a transparent material, said bubble tube being curved longitudinally thereof and having a substantial width, a range scale on the upper surface of the bubble tube and extending lengthwise thereof, a frame including side plates, means fixedly mounting the bubble tube between said side plates, a rider formed of a transparent material and positioned above the bubble tube, said side plates having longitudinally extending slots formed therein, said rider being slidably mounted in said slots for manual adjustment relative to the bubble tube, said deflection mechanism including a tubular base, a sleeve slidably mounted in said tubular base and projecting from one end thereof, a cylindrical shell rotatably mounted on said tubular base, a shaft projecting from said cylindrical shell and into said sleeve, interengaging threads on the shaft and sleeve whereby rotation of the shell will extend and retract said sleeve in said tube, a deflection scale on the outer surface of said cylindrical shell, a stationary finger projecting over the surface of said shell, a scale on the finger cooperating with the scale on the shell, a scale on said sleeve and extending lengthwise of the sleeve and a collimator mounted on the outer end of said sleeve.

11. A mortar sight for a gun including a barrel, said sight comprising a range sighting mechanism and a deflection mechanism, clamp means securing said range sighting and deflection mechanisms to the barrel of the gun, said range sighting mechanism including a bubble tube formed of a transparent material, said bubble tube being curved longitudinally thereof and having a substantial width, a range scale on the upper surface of the bubble tube and extending lengthwise thereof, a frame including side plates, means fixedly mounting the bubble tube between said side plates, a rider formed of a transparent material and positioned above the bubble tube, said side plates having longitudinally extending slots formed therein, said rider being slidably mounted in said slots for manual adjustment relative to the bubble tube, said deflection mechanism including a tubular base, a sleeve slidably mounted in said tubular base and projecting from one end thereof, a cylindrical shell rotatably mounted on said tubular base, a shaft projecting from said cylindrical shell and into said sleeve, interengaging threads on the shaft and sleeve whereby rotation of the shell will extend and retract said sleeve in said tube, a deflection scale on the outer surface of said cylindrical shell, a stationary finger projecting over the surface of said shell, a scale on the finger cooperating with the scale on the shell, a scale on said sleeve and extending lengthwise of the sleeve and a collimator mounted on the outer end of said sleeve, said collimator including a disc-like body, said body having a bore extending therethrough, an open sight in said bore, and means detachably securing said disc to the outer end of said sleeve.

12. A mortar sight for a gun including a barrel, said sight comprising a range sighting mechanism and a deflection mechanism, clamp means securing said range sighting and deflection mechanisms to the barrel of the gun, said range sighting mechanism including a bubble tube formed of a transparent material, said bubble tube being curved longitudinally thereof and having a substantial width, a range scale on the upper surface of the bubble tube and extending lengthwise thereof, a frame including side plates, means fixedly mounting the bubble tube between said side plates, a rider formed of a transparent material and positioned above the bubble tube, said side plates having longitudinally extending slots formed therein, said rider being slidably mounted in said slots for manual adjustment relative to the bubble tube, said deflection mechanism including a tubular base, a sleeve slidably mounted in said tubular base and projecting from one end thereof, a cylindrical shell rotatably mounted on said tubular base, a shaft projecting from said cylindrical shell and into said sleeve, interengaging threads on the shaft and sleeve whereby rotation of the shell will extend and retract said sleeve in said tube, a deflection scale on the outer surface of said cylindrical shell, a stationary finger projecting over the surface of said shell, a scale on the finger cooperating with the scale on the shell, a scale on said sleeve and extending lengthwise of the sleeve and a collimator mounted on the outer end of said sleeve, said collimator including a disc-like body, said body having a bore extending therethrough, an open sight in said bore, a pin projecting from one side of the disc body of the collimator, said sleeve having a bore therein to receive said pin, and spring pressed latch means on said sleeve engageable with said pin to hold the collimator on the outer end of said sleeve.

13. A mortar sight for a gun including a barrel, said sight comprising a range sighting mechanism and a deflection mechanism, clamp means securing said range sighting and deflection mechanisms to the barrel of the gun, said range sighting mechanism including a bubble tube formed of a transparent material, said bubble tube being curved longitudinally thereof and having a substantial width, a range scale on the upper surface of the bubble tube and extending lengthwise thereof, a frame including side plates, means fixedly mounting the bubble tube between said side plates, a rider formed of a transparent material and positioned above the bubble tube, said side plates having longitudinally extending slots formed therein, said rider being slidably mounted in said slots for manual adjustment relative to the bubble tube, a cover plate adapted to extend over the entire bubble tube in one position of the cover plate, each of said side plates having a groove at the outer end thereof, said cover plate being pivotally and slidably mounted in said grooves in the side plates at one end of said cover plate, said cover plate being movable in the last named grooves to cover and uncover said bubble tube, and latch means engageable with said cover, said deflection mechanism including a tubular base, a sleeve slidably mounted in said tubular base and projecting from one end thereof, a cylindrical shell rotatably mounted on said tubular base, a shaft projecting from said cylindrical shell and into said sleeve, interengaging threads on the shaft and sleeve whereby rotation of the shell will extend and retract said sleeve in said tube, a deflection scale on the outer surface of said cylindrical shell, a stationary finger projecting over the surface of said shell, a scale on the finger cooperating with the scale on the shell, a scale on said sleeve and extending lengthwise of the sleeve, and a collimator mounted on the outer end of said sleeve.

14. A motar sight for a gun including a barrel, said sight comprising a range sighting mechanism and a deflection mechanism, clamp means securing said range sighting and deflection mechanisms to the barrel of the gun, said range sighting mechanism including a bubble tube formed of a transparent material, said bubble tube being curved longitudinally thereof and having a substantial width, a range scale on the upper surface of the bubble tube and extending lengthwise thereof, a frame including side plates, means fixedly mounting the bubble tube between said side plates, a rider formed of a transparent material and positioned above the bubble tube, said side plates having longitudinally extending slots formed therein, said rider being slidably mounted in said slots for manual adjustment relative to the bubble tube, a cover plate adapted to extend over the entire bubble tube in one position of the cover plate, each of said side plates having a groove at the outer end thereof, said cover plate being pivotally and slidably mounted in said grooves in the side plates at one end of said cover plate, said cover plate being movable in the last named grooves to cover and uncover said bubble tube, and latch means engageable with said cover, said deflection mechanism including a tubular base, a sleeve slidably mounted in said tubular base and projecting from one end thereof, a cylindrical shell rotatably mounted on said tubular base, a shaft projecting from said cylindrical shell and into said sleeve, interengaging threads on the shaft and sleeve whereby rotation of the shell will extend and retract said sleeve in said tube, a deflection scale on the outer surface of said cylindrical shell, a stationary finger projecting over the surface of said shell, a scale on the finger cooperating with the scale on the shell, a scale on said sleeve and extending lengthwise of the sleeve and a collimator mounted on the outer end of said sleeve, said collimator including a disc-like body, said body having a bore extending therethrough, an open sight in said bore, and means detachably securing said disc to the outer end of said sleeve.

15. A mortar sight for a gun including a barrel, said sight comprising a range sighting mechanism and a deflection mechanism, clamp means securing said range sighting and deflection mechanisms to the barrel of the gun, said range sighting mechanism including a bubble tube formed of a transparent material, said bubble tube being curved longitudinally thereof and having a substantial width, a range scale on the upper surface of the bubble tube and extending lengthwise thereof, a frame including side plates, means fixedly mounting the bubble tube between said side plates, a rider formed of a transparent material and positioned above the bubble tube, said side plates having longitudinally extending slots formed therein, said rider being slidably mounted in said slots for manual adjustment relative to the bubble tube, a cover plate adapted to extend over the entire bubble tube in one position of the cover plate, each of said side plates having a groove at the outer end thereof, said cover plate being pivotally and slidably mounted in said grooves in the side plates at one end of said cover plate, said cover plate being movable in the last named grooves to cover and uncover said bubble tube, and latch means engageable with said cover, said deflection mechanism including a tubular base, a sleeve slidably mounted in said tubular base and projecting from one end thereof, a cylindrical shell rotatably mounted on said tubular base, a shaft projecting from said cylindrical shell and into said sleeve, interengaging threads on the shaft and sleeve whereby rotation of the shell will extend and retract said sleeve in said tube, a deflection scale on the outer surface of said cylindrical shell, a stationary finger projecting over the surface of said shell, a scale on the finger cooperating with the scale on the shell, a scale on said sleeve and extending lengthwise of the sleeve and a collimator mounted on the outer end of said sleeve, said collimator including a disc-like body, said body having a bore extending therethrough, an open sight in said bore, a pin projecting from one side of the disc body of the collimator, said sleeve having a bore therein to receive said pin, and spring pressed latch means on said sleeve engageable with said pin to hold the collimator on the outer end of said sleeve.

No references cited.